United States Patent
Liao

(10) Patent No.: US 10,211,437 B2
(45) Date of Patent: Feb. 19, 2019

(54) ELECTRONIC DEVICE AND BATTERY LOCKING MECHANISM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yuan-Fei Liao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 306 days.

(21) Appl. No.: 15/171,036

(22) Filed: Jun. 2, 2016

(65) Prior Publication Data

US 2017/0294632 A1 Oct. 12, 2017

(30) Foreign Application Priority Data

Apr. 6, 2016 (CN) .......................... 2016 1 0206967

(51) Int. Cl.
  *H01M 2/10* (2006.01)
  *H01M 2/02* (2006.01)
  *H01M 2/12* (2006.01)

(52) U.S. Cl.
  CPC ...... *H01M 2/1066* (2013.01); *H01M 2220/30* (2013.01)

(58) Field of Classification Search
  CPC ........ H01M 2/10; H01M 2/02; H01M 2/1077; H01M 2/12
  See application file for complete search history.

(56) References Cited

U.S. PATENT DOCUMENTS

| 6,197,443 | B1* | 3/2001 | Gotou | H01M 2/1055 |
| | | | | 429/97 |
| 6,256,194 | B1* | 7/2001 | Choi | G06F 1/1616 |
| | | | | 292/4 |
| 2007/0010219 | A1* | 1/2007 | Qin | H04B 1/3883 |
| | | | | 455/128 |
| 2009/0263713 | A1* | 10/2009 | Shi | H01M 2/1066 |
| | | | | 429/177 |
| 2010/0119923 | A1* | 5/2010 | Wu | H01M 2/1066 |
| | | | | 429/97 |
| 2010/0328861 | A1* | 12/2010 | Liu | H01M 2/1066 |
| | | | | 361/679.01 |
| 2012/0028095 | A1* | 2/2012 | Wang | H01M 2/1066 |
| | | | | 429/100 |

* cited by examiner

*Primary Examiner* — Kenneth J Douyette
(74) *Attorney, Agent, or Firm* — ScienBiziP, P.C.

(57) ABSTRACT

A battery locking mechanism applied in an electronic device is provided. The electronic device includes a casing. The casing defines a receiving portion to receive the battery and the battery locking mechanism. The battery locking mechanism includes a first latching element, a second latching element, a first elastic member and a second elastic member. The first elastic member connects the first latching element to the casing and the second elastic member connects the second latching element to the cover. When the first latching element is latched with the second latching element in a relaxed state, the battery is locked. The second latching element can be moved away from the first latching element by a fingertip until the second latching element loses contact with the first latching element, thus unlocking the battery compartment. An electronic device using the locking mechanism is also provided.

8 Claims, 4 Drawing Sheets

ELECTRONIC DEVICE AND BATTERY LOCKING MECHANISM

CROSS-REFERENCE TO RELATED APPLICATIONS

This application claims priority to Chinese Patent Application No. 201610206967.4 filed on Apr. 6, 2016.

FIELD

The subject matter herein generally relates to battery locking mechanisms, and particularly to a battery locking mechanism and an electronic device using the battery locking mechanism.

BACKGROUND

A battery is necessary in many electronic devices, such as a smart phone, a computer, a camera, and the like. Battery locking mechanisms are necessary for locking batteries to the electronic devices.

BRIEF DESCRIPTION OF THE DRAWINGS

Implementations of the present technology will now be described, by way of example only, with reference to the attached figures.

DETAILED DESCRIPTION

Figure 1:
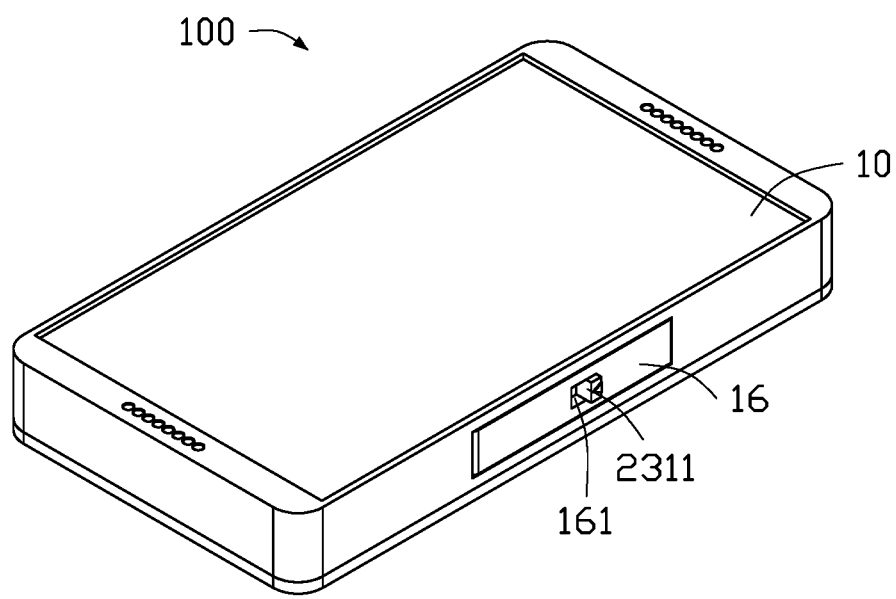
FIG. 1 is an isometric view illustrating an embodiment of an electronic device connected to a battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

Figure 2:
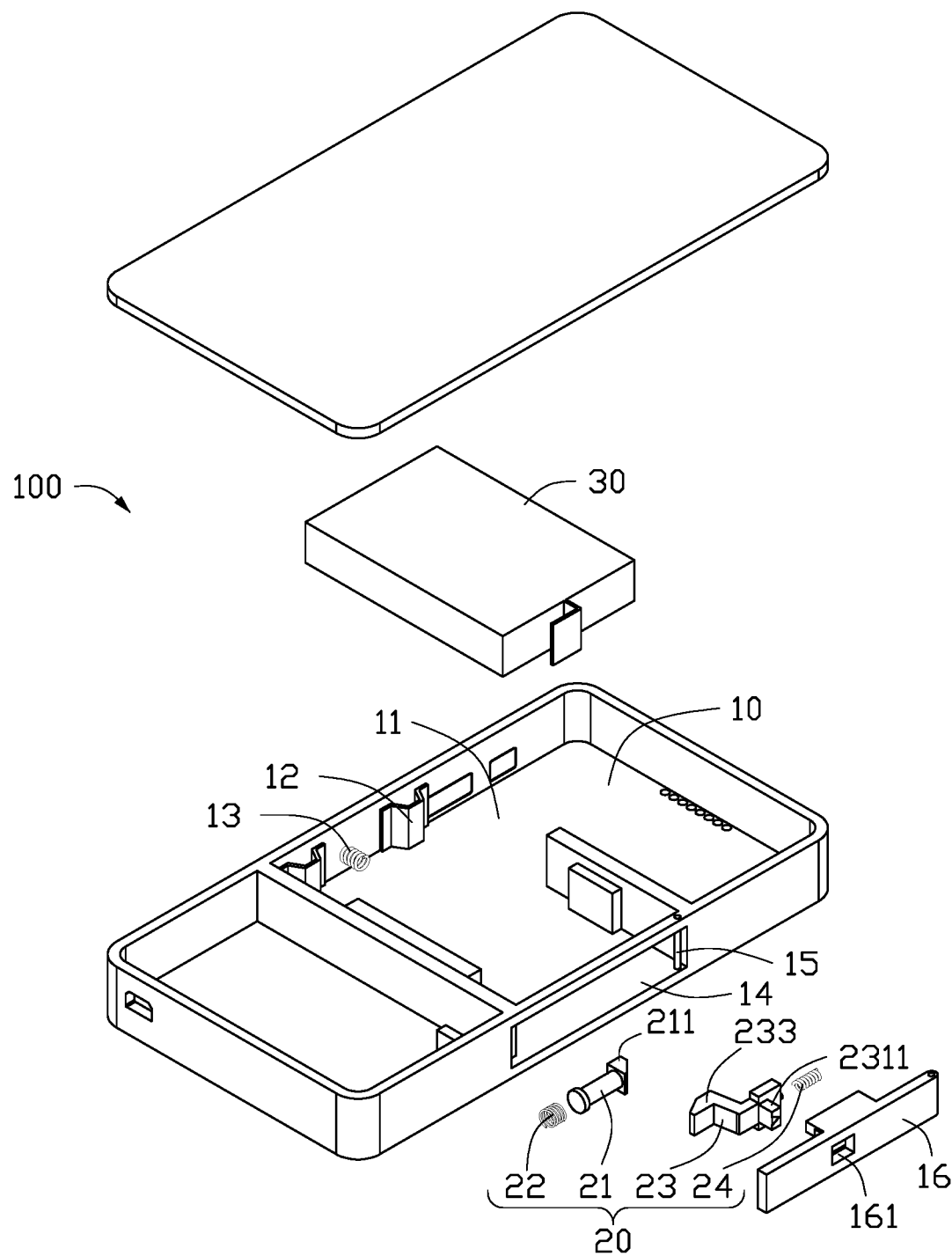
FIG. 2 is an exploded view of the electronic device in FIG. 1.

FIG. 1 and FIG. 2 illustrate an embodiment of an electronic device 100. In the exemplary embodiment, the electronic device 100 at least includes a casing 10, a battery locking mechanism 20, and a battery 30. The casing 10 defines a receiving portion 11 to receive the battery 30 and the battery locking mechanism 20. In the exemplary embodiment, the electronic device 100 can be a mobile phone, a computer, a camera, or the like. The electronic device 100 includes many other elements not shown and not relevant to this application.

Figure 3:
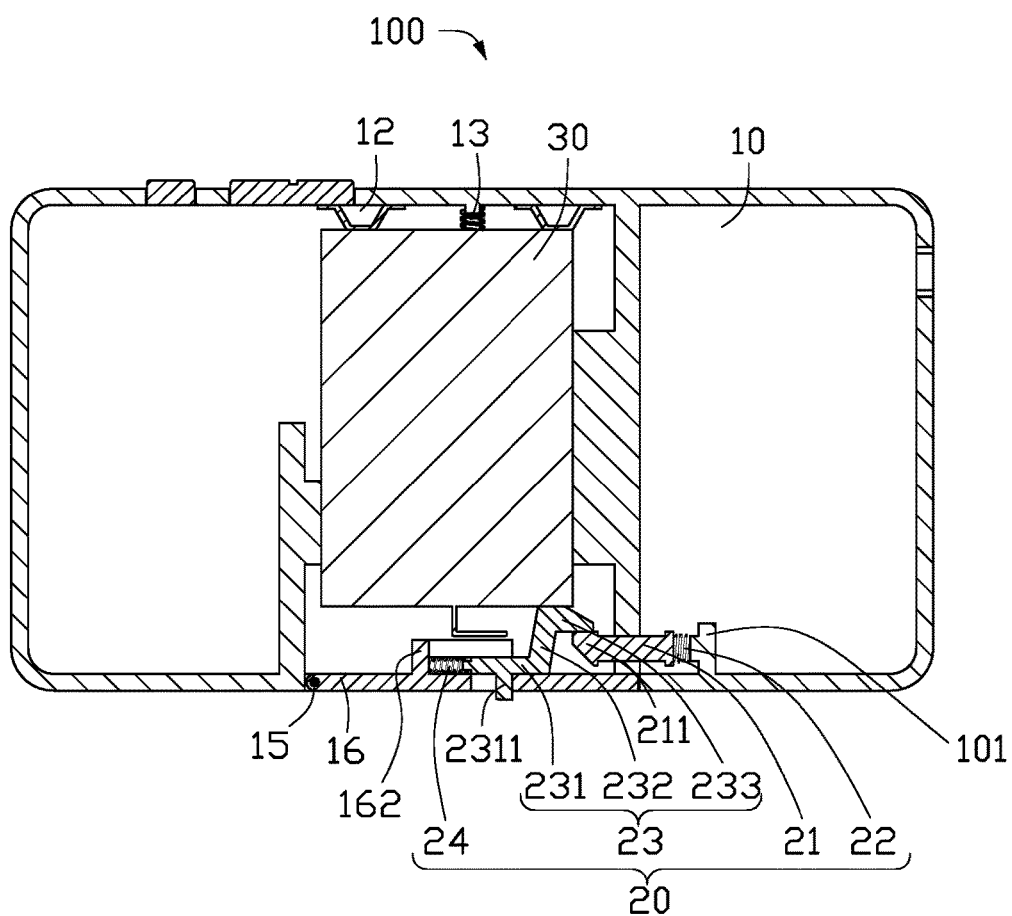
FIG. 3 is a cross-sectional view of the electronic device in FIG. 1.

Referring to FIG. 2 and FIG. 3, in the exemplary embodiment, the receiving portion 11 is substantially a square space. A sidewall of the receiving portion 11 defines at least one contact electrode 12 which corresponds to at least one electrode (not shown) of the battery 30. When the battery 30 is received in the receiving portion 11, the at least one contact electrode 12 contacts the at least one electrode of the battery 30, thus the battery 30 can supply power for the electronic device 100. An elastic element 13 is mounted on a sidewall of the receiving portion 11. When the battery 30 is receiving in the receiving portion 11, the elastic element 13 is compressed by the battery 30. The elastic restoring force of the elastic element 13 pushes the battery 30 out of the receiving portion 11.

An opening 14 is defined in another sidewall, which faces the elastic element 13, of the receiving portion 11. In the exemplary embodiment, the opening 14 is rectangular-shaped. The battery 30 can be inserted into the receiving portion 11 or pushed out of the receiving portion 11 through the opening 14. A shaft 15 is mounted on one side of the opening 14, a cover 16 is rotatably connected to the side of the opening 14 by the shaft 15.

The cover 16 covers the opening 14.

In the exemplary embodiment, the battery locking mechanism 20 includes a first latching element 21, a first elastic member 22, a second latching element 23, and a second elastic member 24.

In the exemplary embodiment, the first latching element 21 is substantially rod-shaped. One end of the first latching element 21 is connected to the casing 10 by the first elastic member 22. In the exemplary, the casing 10 defines a first projection 101 on an inner sidewall, the first latching element 21 is connected to the projection 101 by the first elastic member 22. In the exemplary embodiment, the first latching element 21 is movable toward the opening 14 or away from the opening 14 under the elastic force of the first elastic member 22. In the exemplary embodiment, the first elastic member 22 is a spring. Another end of the first latching element 21 is free and defines a first wedge portion 211 thereon. An inclined surface of the first wedge portion 211 faces the opening 14.

In the exemplary embodiment, the second latching element 23 includes a sliding portion 231, a connecting portion 232, and a second wedge portion 233. One end of the sliding portion 231 is connected to the cover 16 via the second elastic member 24. In detail, one end of the sliding portion 231 is connected to a second projection 162, which projects from an inner side of the cover 16, by the second elastic member 24. The sliding portion 231 is mounted along an inner surface of the cover 16 and slides along the longitudinal direction of the cover 16. One end of the connecting portion 232 is connected to the other end of the sliding portion 231. Another end of the connecting portion 232 is connected to the second wedge portion 233. In the exemplary embodiment, the connecting portion 232 is substantially perpendicular to the sliding portion 231. An inclined surface of the second wedge portion 233 faces the inclined surface of the first wedge portion 211. When the first elastic member 22 and the second elastic member 24 are in a relaxed state, the first wedge portion 211 latches the second wedge portion 233, as shown in FIG. 3.

It can be understood that in another exemplary embodiment, the first latching element 21 and the second latching element 23 need not include the wedge portions, or in another exemplary embodiment, other shapes, such as triangle and rectangle can be substituted for the shape of the wedge portion of the first latching element 21 and the second latching element 23 as disclosed in the exemplary embodiments.

In the exemplary embodiment, a through hole 161 is defined in the cover 16. An operating portion 2311 projects from the sliding portion 231. When the sliding portion 231 is connected to the casing 10 by the second elastic member 24, the operating portion 2311 passes through the through hole 161 and extends out of the cover 16. The fingertip of a user can move the sliding portion 231 toward or away from the first latching element 21 by pulling the operating portion 2311.

Figure 4:
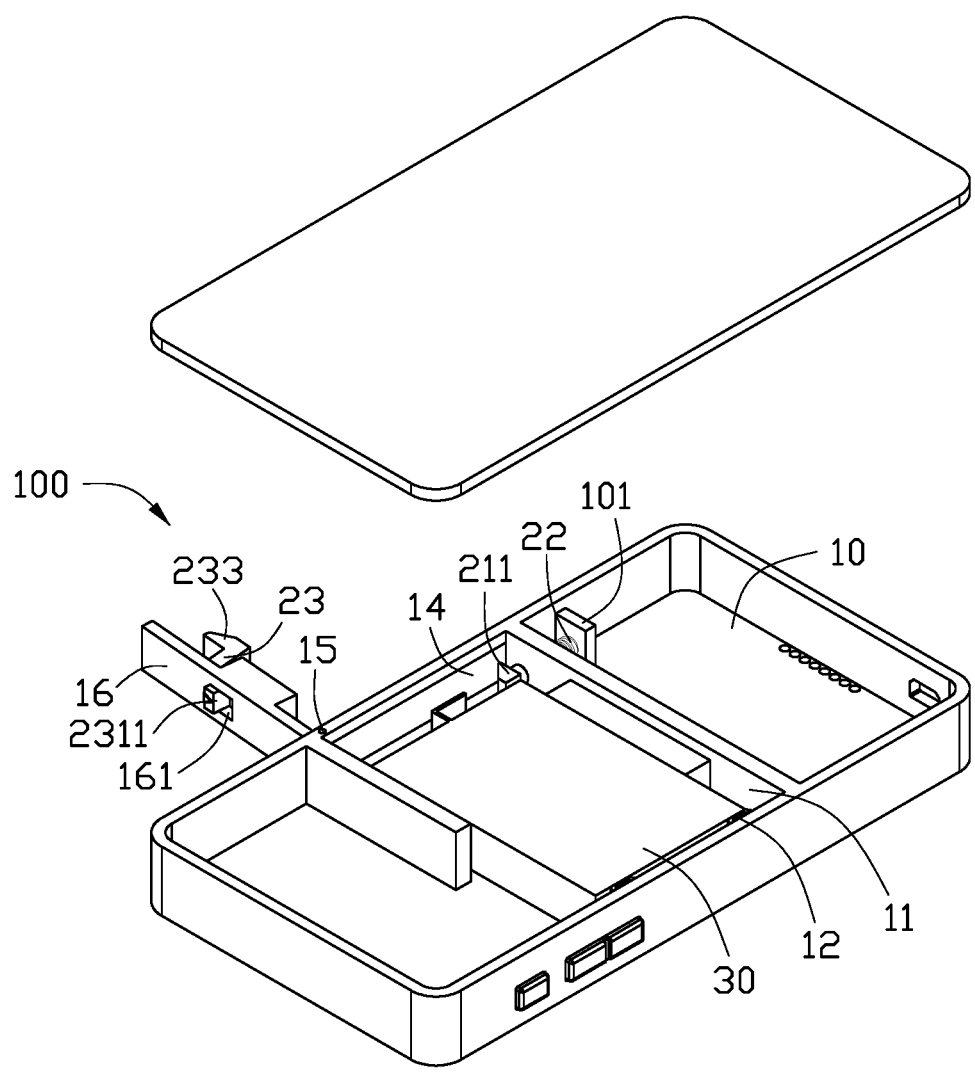
FIG. 4 is an isometric view of the electronic device in FIG. 1 during operation.

Referring to FIG. 3 and FIG. 4, when a user needs to take the battery 30 out of the receiving portion 11, the user moves the operating portion 2311 away from the first latching element 21, thus the operating portion 2311 moves the second latching element 23 away from the first latching element 21. When the second wedge portion 233 loses contact with the first wedge portion 211, the cover 16 is opened, as shown in FIG. 4. At the same time, the elastic force of the compressed elastic element 13 pushes the battery 30 out of the opening 14.

When the user mounts the battery 30 into the receiving portion 11, the battery 30 compresses the elastic element 13, and the at least one contact electrode 12 contacts the at least one electrode of the battery 30. When the battery 30 is received in the receiving portion 11, the user can push the cover 16 to rotate around the shaft 15 until the cover 16 covers the opening 14. When the cover 16 covers the opening 14, the inclined surface of the second wedge portion 233 moves along the inclined surface of the first wedge portion 211. At the same time, the interaction between the first wedge portion 211 and the second wedge portion 233 compresses the first elastic member 22 and the second elastic member 24, and the first latching element 21 and the second latching element 23 move away from each other, until the second wedge portion 233 of the second latching element 23 moves into latching contact with the first wedge portion 211. When the second wedge portion 233 is latching contact with the first wedge portion 211, the interaction between the second wedge portion 233 and the first wedge portion 211 ceases. At this point, the first elastic member 22 and the second elastic member 24 respectively drive the first latching element 21 and the second latching element 23 towards each other, until the first latching element 21 latches onto the second latching element 23, as shown in FIG. 3. Thus, the battery 30 can be locked in the receiving portion 11.

It can be understood that, in other exemplary embodiments, in which the first latching element 21 and the second latching element 23 do not have the wedge portions, when the user mounts the battery 30 into the receiving portion, the user can move the operating portion 2311 away from the first latching element 21. The second latching element 23 subsequently moves away from the first latching element 21, and the second elastic member 24 is compressed. Successively, the cover 16 closes the opening 14 and the operating portion 2311 is released, the elastic force of the second elastic member 24 drives the second latching element 23 toward the first latching element 21 until the first latching element 21 latches with the second latching element 23.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the exemplary disclosure.

What is claimed is:

1. An electronic device comprising:
   a battery;
   a casing defining a receiving portion to receive the battery, an opening arranged at a sidewall of the receiving portion, and a cover rotatably connected to one side of the opening; and
   a battery locking mechanism comprising
      a first latching element comprising a first wedge portion arranged on one end of the first element, wherein the first wedge portion has an inclined surface facing the opening;
      a first elastic member connecting one end of the first latching element to the casing, wherein the first wedge portion is arranged on the end away from the first elastic member;
      a second latching element, wherein the second latching element comprises a second wedge portion arranged on one end thereof, the second wedge portion faces the first latching element, and the second wedge portion has an inclined surface facing the inclined surface of the first wedge portion; and
      a second elastic member connecting one end of the second latching element to the cover;
   wherein in a relaxed state, the first latching element latches with the second latching element to lock the cover, and the battery is locked in the receiving portion; and wherein under an external force, the second latching element is displaced away from the first latching element, the second latching element separates from the first latching element, and the battery is unlocked.

2. The electronic device according to claim 1, wherein the second latching element further comprises a sliding portion and a connecting portion, the sliding portion is mounted along an inner surface of the cover and slides along a longitudinal direction of the cover; one end of the connecting portion is connected to the sliding portion at a right angle, and the second wedge portion is connected to another end of the connecting portion.

3. The electronic device according to claim 2, wherein the cover defines a through hole therein, and the sliding portion has an operating portion projecting from the sliding portion, when the sliding portion is connected to the casing by the second elastic member, the operating portion passes through the through hole and extends out of the cover.

4. The electronic device according to claim 1, wherein the first elastic member and the second elastic member are springs.

5. The electronic device according to claim 1, wherein the receiving portion has a sidewall defined with at least one contact electrode thereon; and the receiving portion has an elastic element mounted on the sidewall thereof and pushing the battery out of the receiving portion.

6. A battery locking mechanism applied in an electronic device, the electronic device comprising a casing defining a receiving portion to receive a battery and the battery locking mechanism, the receiving portion having an opening arranged at a sidewall thereof, the opening has a cover rotatably connected to one side thereof, and the battery locking mechanism comprising:
   a first latching element comprising a first wedge portion arranged on one end of the first element, wherein the first wedge portion has an inclined surface facing the opening;

a first elastic member connecting one end of the first latching element to the casing, wherein the first wedge portion is arranged on the end away from the first elastic member;

a second latching element, wherein the second latching element comprises a second wedge portion arranged on one end thereof, the second wedge portion faces the first latching element, and the second wedge portion has an inclined surface facing the inclined surface of the first wedge portion; and a second elastic member connecting one end of the second latching element to the cover;

wherein in a relaxed state, the first latching element latches with the second latching element to lock the cover, and the battery is locked in the receiving portion; and wherein under an external force, the second latching element is displaced away from the first latching element, the second latching element separates from the first latching element, and the battery is unlocked.

7. The battery locking mechanism according to claim 6, wherein the second latching element further comprises a sliding portion and a connecting portion, the sliding portion is mounted along an inner surface of the cover and slides along a longitudinal direction of the cover; one end of the connecting portion is connected to the sliding portion at a right angle, and the second wedge portion is connected to another end of the connecting portion.

8. The battery locking mechanism according to claim 7, wherein the cover defines a through hole therein, and the sliding portion has an operating portion projecting from the sliding portion, when the sliding portion is connected to the casing by the second elastic member, the operating portion passes through the through hole and extends out of the cover.

* * * * *